United States Patent
Weibel

(10) Patent No.: US 11,403,079 B2
(45) Date of Patent: Aug. 2, 2022

(54) INTEGRATED SYSTEM FOR DESIGNING A USER INTERFACE

(71) Applicant: salesforce.com, inc., San Francisco, CA (US)

(72) Inventor: Alan Weibel, San Francisco, CA (US)

(73) Assignee: Salesforce, Inc., San Francisco, CA (US)

(*) Notice: Subject to any disclaimer, the term of this patent is extended or adjusted under 35 U.S.C. 154(b) by 0 days.

(21) Appl. No.: 16/774,392

(22) Filed: Jan. 28, 2020

(65) Prior Publication Data
US 2021/0232375 A1    Jul. 29, 2021

(51) Int. Cl.
| G06F 8/38 | (2018.01) |
| H04L 29/06 | (2006.01) |
| G06F 8/60 | (2018.01) |
| G06F 9/445 | (2018.01) |
| G06F 11/36 | (2006.01) |
| H04L 9/40 | (2022.01) |
| G06N 20/00 | (2019.01) |

(52) U.S. Cl.
CPC .............. *G06F 8/38* (2013.01); *G06F 8/60* (2013.01); *H04L 63/0815* (2013.01); *G06F 9/44505* (2013.01); *G06F 11/3664* (2013.01); *G06N 20/00* (2019.01)

(58) Field of Classification Search
None
See application file for complete search history.

(56) References Cited

U.S. PATENT DOCUMENTS

| 10,481,761 | B2 | 11/2019 | Jouhikainen et al. |
| 10,705,860 | B2 | 7/2020 | Koren et al. |
| 11,074,054 | B1 | 7/2021 | Weibel |
| 2003/0132970 | A1 | 7/2003 | Lehmeier et al. |
| 2003/0177376 | A1* | 9/2003 | Arce Velleggia ....... G06F 21/33 713/189 |
| 2003/0197735 | A1 | 10/2003 | Woltzen |

(Continued)

OTHER PUBLICATIONS

Williams, "Eight Evil Things Microsoft Never Showed You in the ClickOnce Demos (and What You Can Do About Some of Them)," Jan./Feb. 2009, https://www.codemag.com/article/0902031/Eight-Evil-Things-Microsoft-Never-Showed-You-in-the-ClickOnce-Demos-and-What-You-Can-Do-About-Some-of-Them.*

(Continued)

*Primary Examiner* — Ryan Barrett
(74) *Attorney, Agent, or Firm* — Sterne, Kessler, Goldstein & Fox P.L.L.C.

(57) ABSTRACT

The present disclosure is directed to systems and methods for deploying a prototype of a user interface. For example, the method may include providing a single sign-on process over a communications network for enabling a user to access a design environment. The method may also include providing the design environment to the user for designing the UI. The method may also include deploying, via the design environment, the prototype of the UI to an instance from among a plurality of instances. Each of the plurality of instances may be associated with a different stage in a development process for designing the UI. Deploying the prototype of the UI may include transitioning the prototype of the UI from a first stage to a second stage of the development process.

20 Claims, 12 Drawing Sheets

(56) References Cited

U.S. PATENT DOCUMENTS

| | | | |
|---|---|---|---|
| 2006/0095276 A1* | 5/2006 | Axelrod | G06Q 99/00 |
| | | | 717/104 |
| 2007/0130205 A1* | 6/2007 | Dengler | G06F 9/451 |
| 2007/0143398 A1 | 6/2007 | Graham | |
| 2007/0198928 A1 | 8/2007 | Tseng | |
| 2007/0265900 A1* | 11/2007 | Moore | G06Q 10/0635 |
| | | | 705/7.12 |
| 2007/0271330 A1 | 11/2007 | Mattox et al. | |
| 2008/0021997 A1 | 1/2008 | Hinton | |
| 2009/0249439 A1* | 10/2009 | Olden | H04L 63/0815 |
| | | | 726/1 |
| 2009/0313601 A1* | 12/2009 | Baird | G06F 8/34 |
| | | | 717/106 |
| 2009/0319921 A1* | 12/2009 | Abel | G06F 8/38 |
| | | | 715/760 |
| 2013/0232480 A1* | 9/2013 | Winterfeldt | G06F 8/60 |
| | | | 717/177 |
| 2014/0047413 A1 | 2/2014 | Sheive et al. | |
| 2014/0087355 A1* | 3/2014 | Henry | G09B 7/00 |
| | | | 434/362 |
| 2014/0195931 A1 | 7/2014 | Kwon et al. | |
| 2015/0244706 A1 | 8/2015 | Grajek et al. | |
| 2015/0378700 A1* | 12/2015 | Rachamadugu | G06F 8/70 |
| | | | 717/120 |
| 2016/0019096 A1* | 1/2016 | Winterfeldt | G06F 9/5066 |
| | | | 717/177 |
| 2016/0182489 A1 | 6/2016 | Lewis et al. | |
| 2016/0292067 A1 | 10/2016 | Singh et al. | |
| 2017/0006020 A1 | 1/2017 | Falodiya | |
| 2017/0228227 A1* | 8/2017 | Winterfeldt | G06F 9/5072 |
| 2017/0316363 A1 | 11/2017 | Siciliano et al. | |
| 2017/0329465 A1* | 11/2017 | Hong | G06F 3/04883 |
| 2017/0353449 A1 | 12/2017 | Ohbitsu | |
| 2018/0173715 A1 | 6/2018 | Dunne | |
| 2019/0042231 A1 | 2/2019 | Kolhe et al. | |
| 2019/0065159 A1 | 2/2019 | Varadarajan et al. | |
| 2019/0114059 A1 | 4/2019 | Chakra et al. | |
| 2019/0310762 A1 | 10/2019 | Jouhikainen et al. | |
| 2019/0325626 A1 | 10/2019 | Tao | |
| 2020/0026397 A1 | 1/2020 | Wohlstadter et al. | |
| 2020/0034160 A1 | 1/2020 | Koren et al. | |
| 2020/0133643 A1 | 4/2020 | Hou | |
| 2020/0134388 A1 | 4/2020 | Rohde | |
| 2020/0259817 A1 | 8/2020 | Natarajan et al. | |
| 2021/0232373 A1* | 7/2021 | Weibel | G06F 8/34 |
| 2021/0232374 A1* | 7/2021 | Weibel | G06F 3/0482 |

OTHER PUBLICATIONS

Sempf, "Visual Basic 2005 For Dummies," 2006, Wiley Publishing, Inc.*

Mao, "User Interface Evaluation with Machine Learning Methods," Jan. 2019, https://www.researchgate.net/publication/353636185_User_Interface_Evaluation_with_Machine_Learning_Methods.*

* cited by examiner

INTEGRATED SYSTEM FOR DESIGNING A USER INTERFACE

BACKGROUND

Current designing systems for designing user interfaces include a number of features that may be presented to users. These features, however, may be arbitrarily selected by a limited number designers. Additionally, when adding new UI features, the current design systems require a thorough specification documentation and review process for adding the new UI features. This is time-consuming and inefficient due to the limited number of designers who can review new submissions.

During implementation, these design systems also require a developer and a designer when building a feature or application. For example, a developer may be able to develop the underlying code for the feature or application, yet lack the skill set to design the best-looking feature or application and/or provide the best user experience. On the other hand, the designer may have the skill set to design the best-looking feature or application and/or provide the best user experience, yet lack the knowledge to translate their feature or application into a functioning feature or application with proper coding. Consequently, the current design systems are bifurcated where the designer may design the feature or application in a first environment, which then requires the developer to provide the coding for the feature or application in a second environment, rather than being consolidated into a single environment.

BRIEF DESCRIPTION OF THE DRAWINGS/FIGURES

The accompanying drawings are incorporated herein and form a part of the specification.

DETAILED DESCRIPTION

It is to be appreciated that the Detailed Description section, and not the Summary and Abstract sections, is intended to be used to interpret the claims. The Summary and Abstract sections may set forth one or more but not all example embodiments as contemplated by the inventor(s), and thus, are not intended to limit the appended claims in any way.

The present disclosure is directed to a system that is configured to determine which UI features to provide to individual users based on a combination of machine learning algorithms and user feedback. In this way, the system of the present disclosure may provide UI features to users that have been identified as being highly used and also vetted by other users. Additionally, machine learning algorithms may be used to identify which features are most frequently used for different types of UIs based on usage patterns, the role of an individual user, or a combination of both.

The system of the present disclosure may also include a design system accessible via a single sign-on process, where users can view and add UI features to a collection. A user can name this collection and add notes to the collection, and also share the collection with colleagues. In this way, a feature or application specification may be documented and saved for ongoing reference. Additionally, the design system provides for a single environment that allows both designers and engineers to collaboratively work with one another on any given feature or application specification. Additionally, when designing a UI, the user may deploy a prototype of the UI to another stage in a development process for designing in a single environment, i.e., without sending the prototype to an engineer to write code for the prototype.

Figure 1:
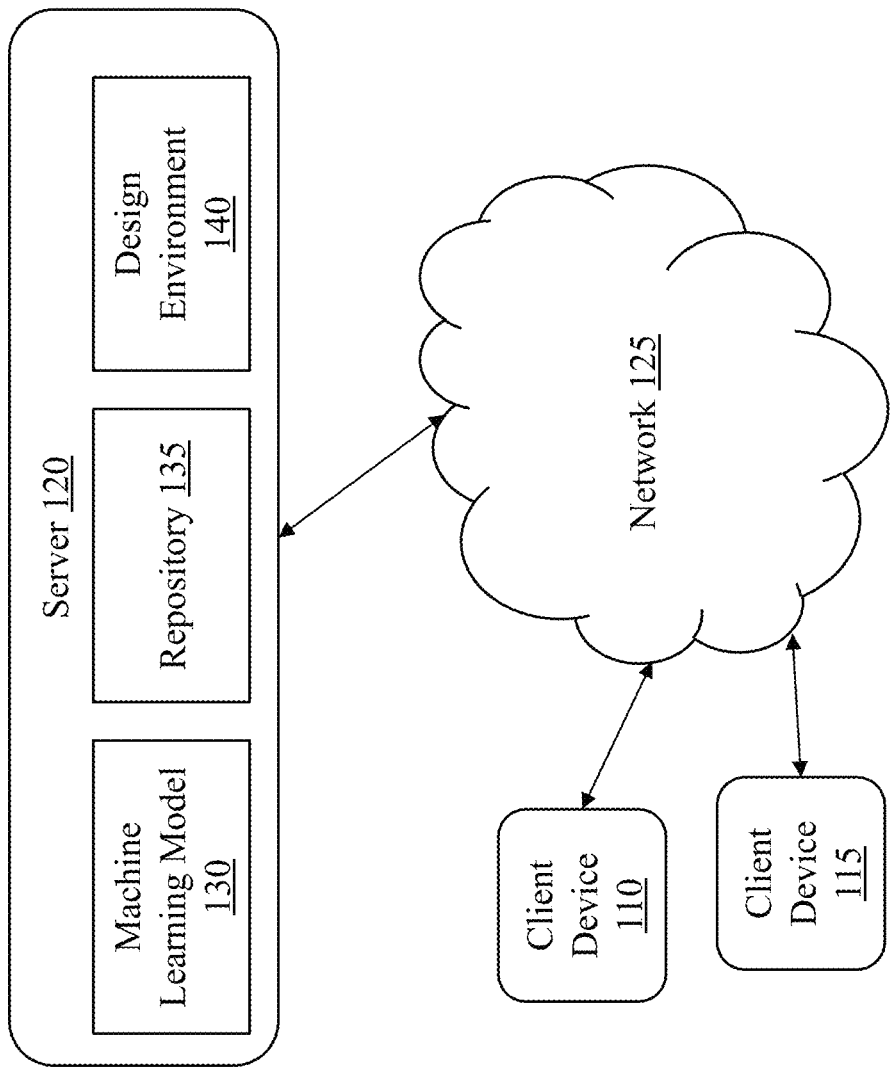
FIG. 1 is a block diagram of a system, according to some example embodiments.

FIG. 1 is a diagram of an example environment 100 in which example systems and/or methods may be implemented. As shown in FIG. 1, environment 100 may include a client device 110, a server 120, a network 125. Devices of the environment 100 may interconnect via wired connections, wireless connections, or a combination of wired and wireless connections. Devices of environment 100 may include a computer system 1200 shown in FIG. 12, discussed in greater detail below. The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

In some embodiments, the client device 110 may be any device that may be used to access an account associated with an operator of the server 120. For example, the client 110 may be a device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. The client device 110 may be used to access a design environment 140 hosted on the server 120 for developing user interfaces (UIs) hosted on the server 120 via the network 125.

The server 120 may include a server device (e.g., a host server, a web server, an application server, etc.), a data center device, or a similar device, capable of communicating with the client device 110 via the network 125. In some embodiments, the server 120 may determine one or more UI features to be provided in the design environment 140. The one or more UI features for the design environment 140 may be stored in a repository 135.

The network 125 may include one or more wired and/or wireless networks. For example, the network 125 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

In some embodiments, the server 102 may be configured to generate a gallery of UI features based on usage patterns of the a plurality of UI features. To achieve this, the server 120 may include a machine learning model 130 to analyze usage of different UI features from among a plurality of UI features to identify usage patterns of the different UI features. For example, the machine learning model 130 may be trained to process the usage information of the plurality of UI features using a combination of one or more techniques, such as a pattern mining technique, a recursive feature elimination technique, a gradient boosting technique, and/or the like. The pattern mining technique may be, for example, a sequential pattern mining technique (e.g. a sequential pattern discovery using equivalence classes (SPADE) technique, a frequent closed sequential pattern mining technique, a vertical mining of maximal sequential patterns (VMSP) technique, and/or the like). In some embodiments, the machine learning model 130 may be based on one or more data mining techniques, such as tracking patterns, classification, association, or clustering.

In some embodiments, the machine learning model 130 may analyze UI features implemented in UIs executing in respective live implementations in order to identify the usage patterns of the different UI features. For example, the machine learning model may analyze different attributes of UIs executing in respective live implementations, such as the types of UI features used, where UI features are placed in the UI, and the like. It should be understood by those of ordinary skill in the arts that these are merely example attributes of the UIs that may be analyzed and that other attributes are further contemplated in accordance with aspects of the present disclosure. To analyze the different attributes, the machine learning model may analyze underlying code of the UIs executing in respective live implementations or analyzing a layout of the UIs executing in respective live implementations.

In some embodiments, the server 120 may be configured to receive user feedback analyzing the gallery of UI features. For example, the user feedback may be received using one or more interfaces associated with the server 120, using the client device 110, or a second client 115 via the network 125. The user feedback may include votes from a plurality of users as to whether or not a given UI should be provided in the design environment 140, e.g., a "yes" or "no" vote, comments from one or more of the plurality of users, or a combination of both. In this way, the plurality of users may vet the UI features identified by the machine learning model 130.

For example, in some instances, the machine learning model 130 may identify a "dark pattern" or "anti-pattern" that may have historically high usage, but may no longer be in high demand. As such, the plurality of user may exchange comments regarding whether or not to include the "dark pattern" or "anti-pattern," and subsequently vote on the issue. In this way, the user feedback may include a request to delete a UI feature. As another example, in some instances, the machine learning model 130 may fail to identify a newly developed UI due to a lack of historical usage, but may be in currently in high demand. As such, the plurality of user may exchange comments regarding whether or not to include the new pattern and subsequently vote on the issue. In this way, the user feedback may include a request to add a UI feature.

In addition, the machine learning model 130 may be further trained to perform a trend analysis on the usage pattern. For example, the machine learning model 130 may determine that the "dark pattern" or the "anti-pattern" is trending downward in terms of overall usage, whereas the machine learning model 130 may determine that the new pattern is trending upward in terms of overall usage. Based on this trend analysis, the machine learning model 130 may flag a given UI feature as being a "dark pattern"/"anti-pattern" or a new pattern.

In some embodiments, the server 120 may be configured to determine, based on a combination of the user feedback and the machine learning model, which UI features from the gallery of UI features to incorporate in the design environment 140. For example, the sever 120 may rank the UI features of the gallery of UI features. For example, the UI features may be ranked based on the number of votes from the plurality of users to include the UI feature. As another example, the UI features may be ranked based on a specific implementation of the UI feature or based on a role of the user implementing the UI feature.

To rank the UI features based on the specific implementation of the UI feature or based on the role of the user implementing the UI feature, the machine learning model 130 may be trained to associate the usage patterns based on a specific implementation of the UI feature. For example, the machine learning model 130 may identify a number of usage patterns for a given UI feature, e.g., twenty usage patterns. However, in one implementation, such as a content management system (CMS), the machine learning model 130 may identify a different number of usage patterns for the given feature, e.g., two usage patterns, and in a second implementation, such as a navigation page, the machine learning model 130 may identify a yet different number of usage patterns for the given feature, e.g., five usage patterns or no usage patterns. Even further, in some embodiments, the machine learning model 130 may be trained to associate the usage patterns based on a role of the user implementing the UI feature. For example, the machine learning model 130 may identify a number of usage patterns for a given UI feature, e.g., twenty usage patterns. However, the machine learning model 130 may identify that more experienced users implement the given UI feature more frequently than novice users. To achieve this, the machine learning model 130 may be trained using an association algorithm, such as, but not limited to, an apriori algorithm, eclat algorithm, or a frequent-pattern growth (FP-growth) algorithm to associate the usage patterns based on the specific implementation of the UI feature or the role of the user. Using this information, the server 120 may rank the UI features based on the usage for the specific implementation and/or role of the user.

Additionally, the server 120 may apply one or more criteria to the ranked UI features. In some embodiments, the one or more criteria may include a minimum number of times a UI feature has been used, a minimum number of votes from the plurality of users to include the UI feature, a minimum number uses of the UI feature based on the usage for the specific implementation and/or role of the user, limiting the determined UI features to a top number of the ranked UI features, e.g., a top three, or any combination thereof. It should be understood by those of ordinary skill in the art that these are merely example criteria that may be applied and that other criteria are further contemplated in accordance with aspects of the present disclosure.

In some embodiments, after determining which features to include, the server 120 may store the determined UI features in the repository 135, such that the determined UI features may be provided to the user in the design environment 140, which may be accessed over the network 125.

Figure 2:
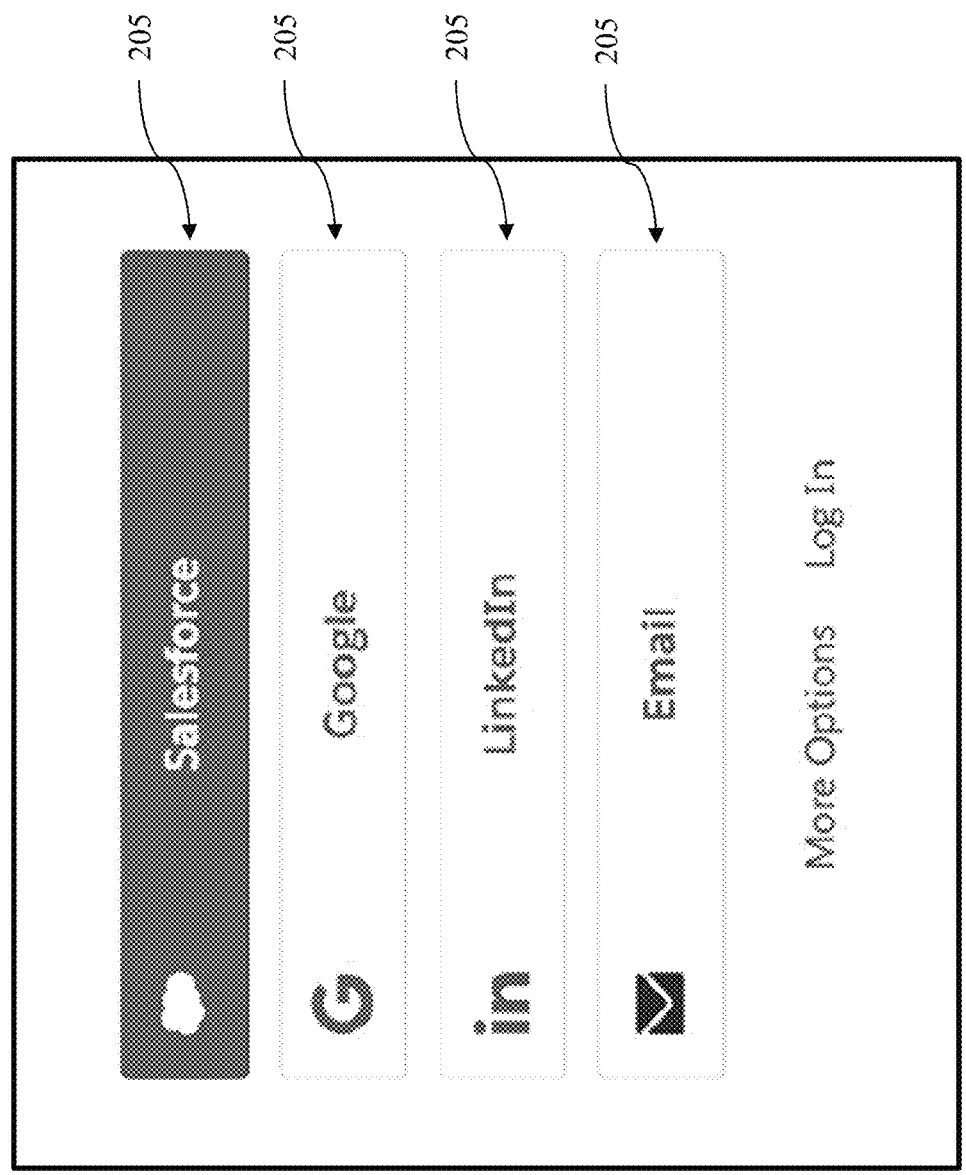
FIG. 2 illustrates an example screen shot of a single sign-on process, according to some example embodiments.

In some embodiments, the user may access the design environment 140 using the client device 110 over the network 125 using a single sign-on process. For example, FIG. 2 illustrates an example screen shot of the single sign-on process. As shown in FIG. 2, the user may access the design environment 140 using any one of a plurality of accounts 205. As should be understood by those of ordinary skill in the art the SSO process enables users to securely authenticate with the design environment 140 with one set of credentials, e.g., a username and password. As such, the design environment 140 may rely on a trusted third party to authenticate the user.

In some embodiments, in response to authenticating the user, the server 120 may retrieve a profile associated with the user that provides details regarding different attributes of the user. For example, the attributes may include, but are not limited to, a skill level of the user, i.e., an expert designer, an intermediate designer, a novice designer, etc., a target client for whom the user is designing for, the type of UI that the user is designing, etc. In some embodiments, the server may provide one or more features for designing the UI to the user based on the attributes. For example, in some embodiments, the server 120 may provide a greater number of UI features for a more experienced user than a novice user. As another example, the server 120 may provide the user with a selection of UI features based on preferences the target client. In yet another example, the UI features provided for a first type of UI may be a first set of UI features, whereas the UI features provided for a second type of UI may be a second set of UI features. In some embodiments, the UI features provided to the user may be determined based on the user feedback and the machine learning model 130, as described herein.

In some embodiments, a user may select to expand the list of available UI features to display additional UI features. However, a user's ability to do so may be defined by an administrator. For example, the administrator may select to preclude users from accessing the additional UI features based on the target client or based on the experience level of the user.

Figure 3:
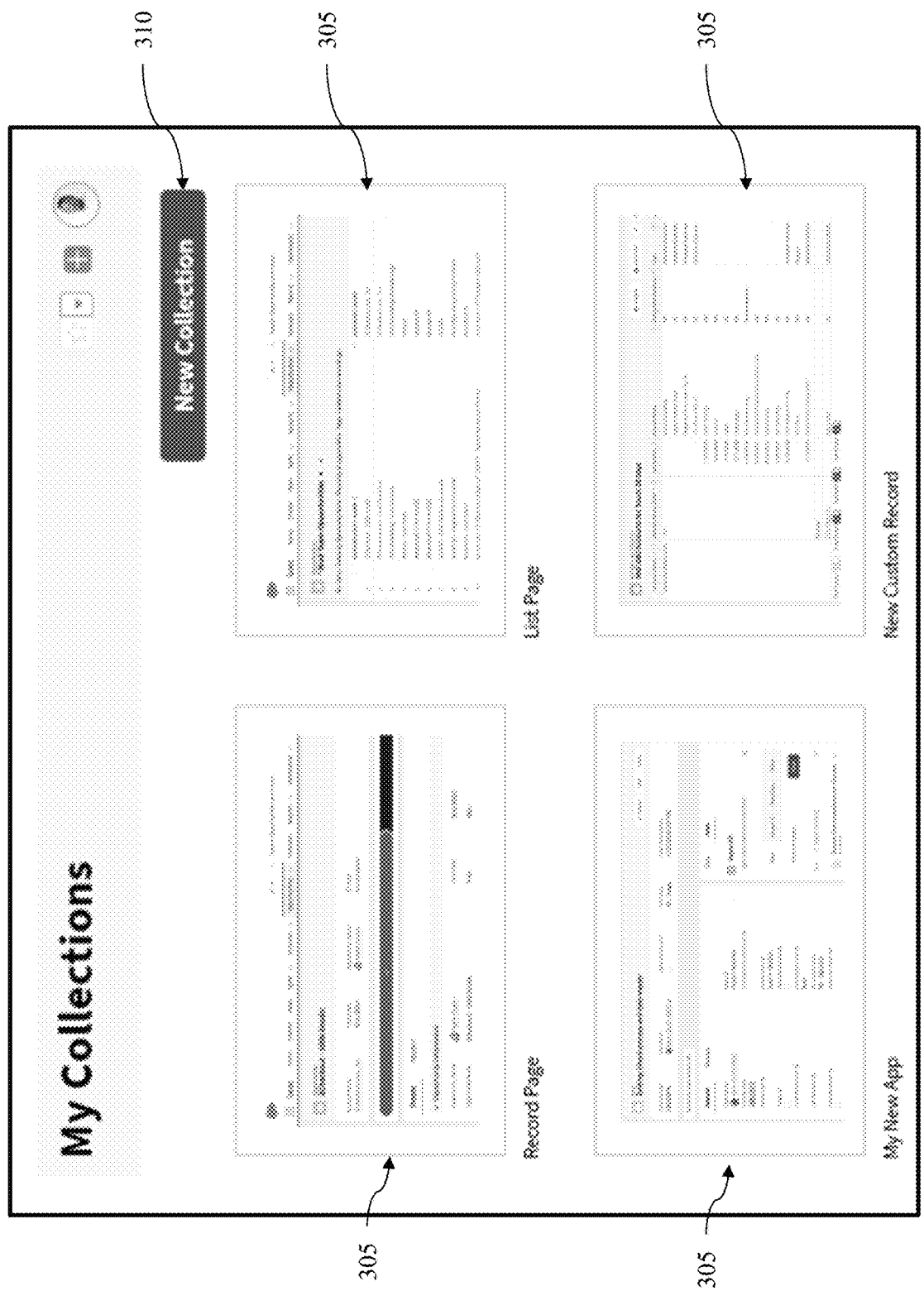
FIG. 3 illustrates an example screen shot of a plurality of collections associated with a user, according to some example embodiments.

In some embodiments, the user may create a collection using the list of available UI features. The collection may be two or more UI features combined together to create an experience, e.g., a UI or an application. FIG. 3 illustrates an example screen shot of a plurality of collections associated with a user. As illustrated in FIG. 3, the design environment 140 may display any collections 305 created by the user. For example, the collections 305 may include, but are not limited to, a record page, a list page, a new application, or a new custom record. It should understood by those of ordinary skill in the art that these are merely examples of collections that may be designed and that other collections are further contemplated in accordance with aspects of the present disclosure. As further illustrated in FIG. 3, the user may create collection via a one-click option 310, and based on the type of new collection being designed, the machine learning model 130 may present a plurality of UI features associated with that type of collection, as discussed herein.

Figure 4:
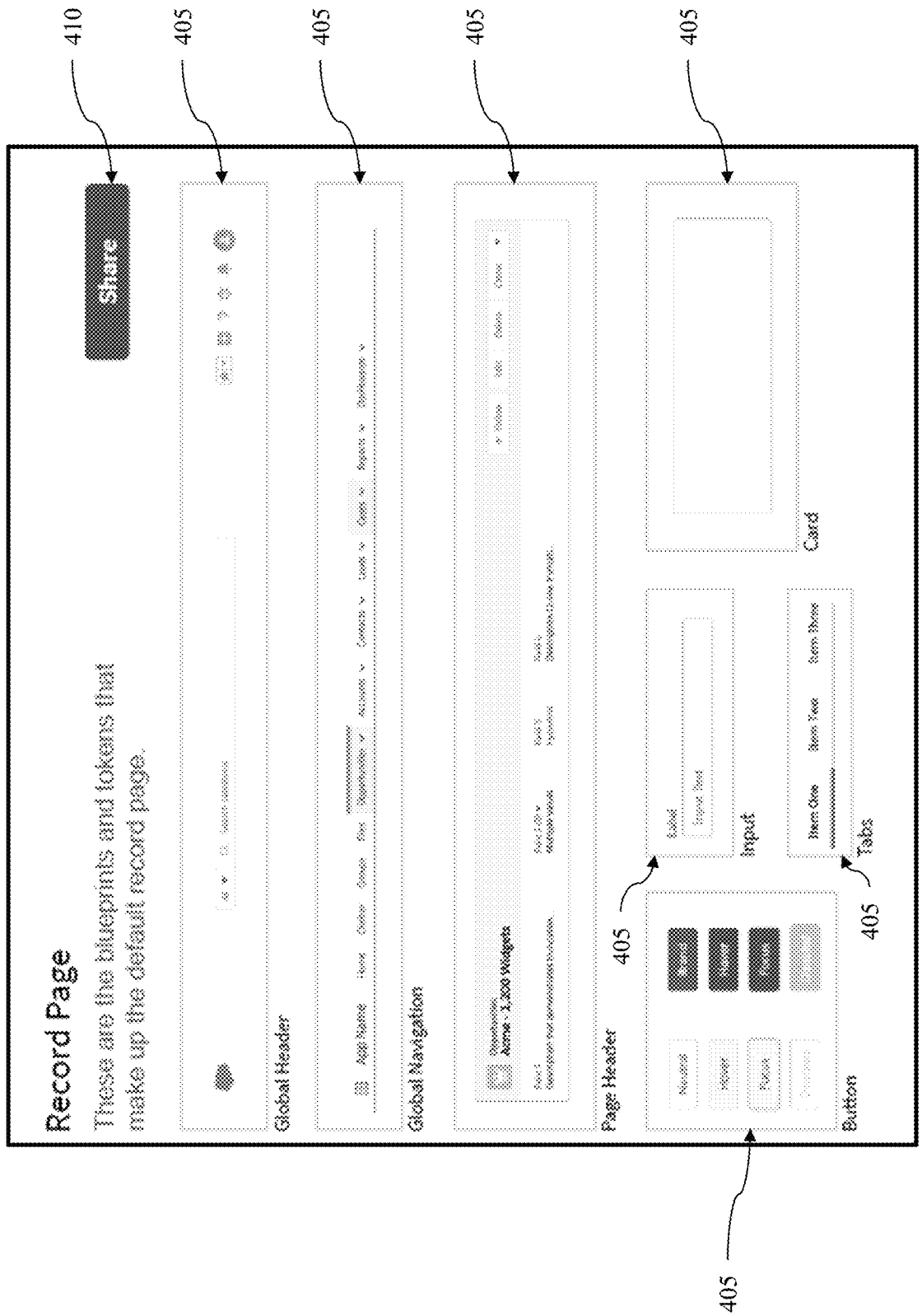
FIG. 4 illustrates an example screen shot of a collection having a plurality of UI features, according to some example embodiments.

In some embodiments, the collections 305 may include a plurality of UI features. Using the records page collection as an example, FIG. 4 illustrates an example screen shot of a collection having a plurality of UI features 405. For example, as shown in FIG. 4, the plurality of UI features 405 may include a global header, a global navigation bar, a page header, one or more buttons, an input, one or more tabs, and a card. As further shown in FIG. 4, the collection 400 may be shared with a second user using a one-click option 410.

In some embodiments, the user may annotate a collection with comments about the collection itself and/or UI features within the collection. For example, the user may add comments detailing revisions made the collection, comments regarding the usage of a given UI feature, etc. In this way, the user may refer back to the annotations when using the collection in the future. Additionally, when the user shares the collection with the second user, the second user may likewise refer to the annotations when using the collection. In some embodiment, the collections 300, including any annotations, may be stored on the repository 135 and associated with the user profile, such that the user may access the collections each time the user signs in to the design environment 140.

Figure 5:
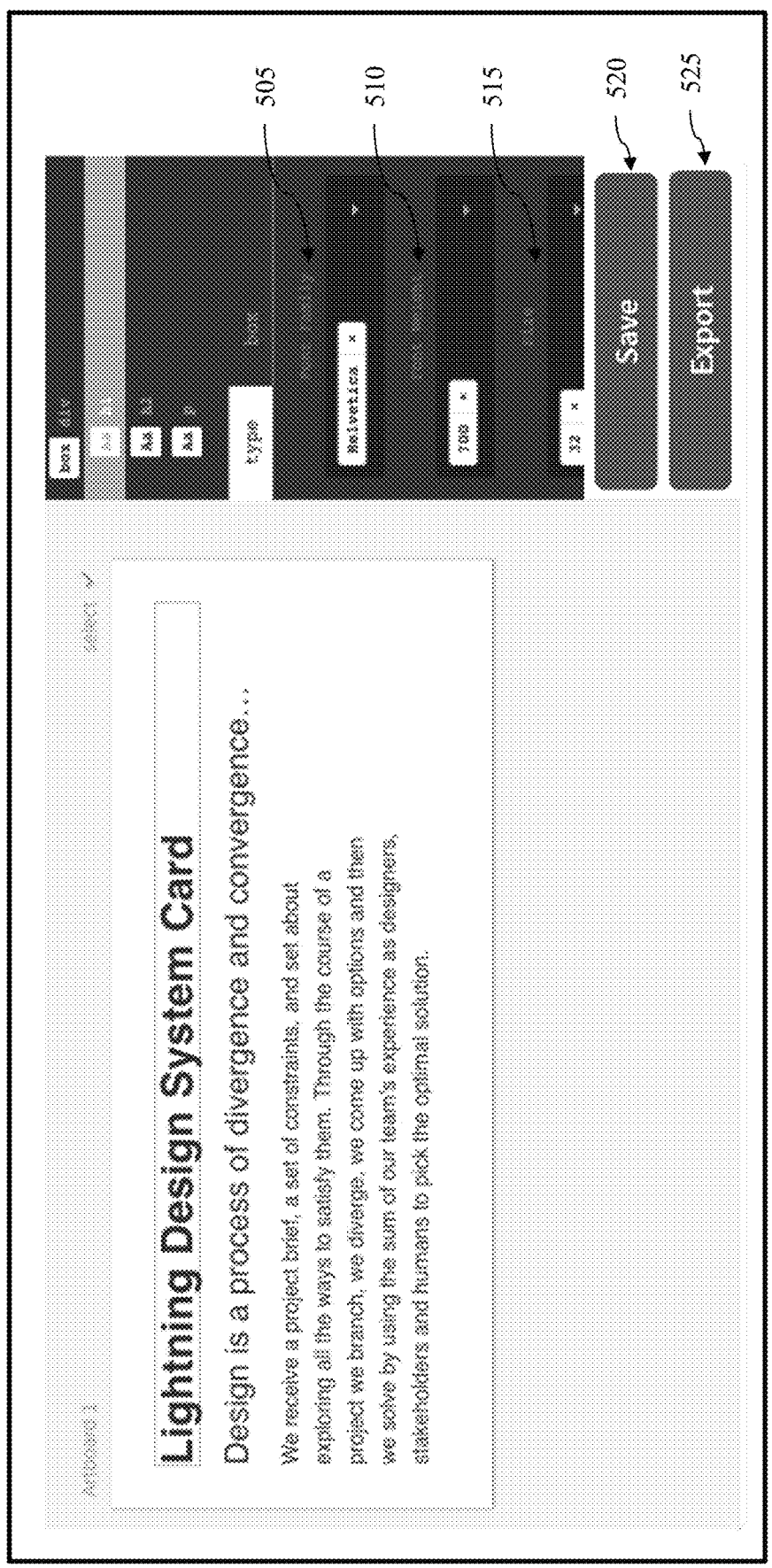
FIG. 5 illustrates an example screen shot an interactive tool for editing a UI feature, according to some example embodiments.

In some embodiments, the design environment 140 may include an interactive tool for editing a UI feature. For example, FIG. 5 illustrates an example screen shot an interactive tool for editing a UI feature. In the example shown in FIG. 5, the user may use an interactive tool 500 to edit a font family 505, a font weight 510, a font size 515. It should be understood by those of ordinary skill in the art that this is merely one example of an UI feature and elements thereof that may be edited using the interactive tool 500 and that other UI features and corresponding elements are further contemplated in accordance with aspects of the present disclosure. In some embodiments, the interactive tool may also provide guidelines for editing the UI feature. For example, the guidelines may include instructions for how to use the UI feature and/or limitations for editing the UI feature, e.g., which elements can be modified and how they can be modified. In some embodiments, the guidelines may be based on the type of collection being created. For example, a records page, such as the records page 400 of FIG. 4, may be limited to having a single global header 405. As further illustrated in FIG. 5, the user may save the edited UI feature to a current collection using the "SAVE" button 520 or the user may export the edited UI feature to another collection or a prototype of a user interface/application using the "EXPORT" button 525.

Figure 6:
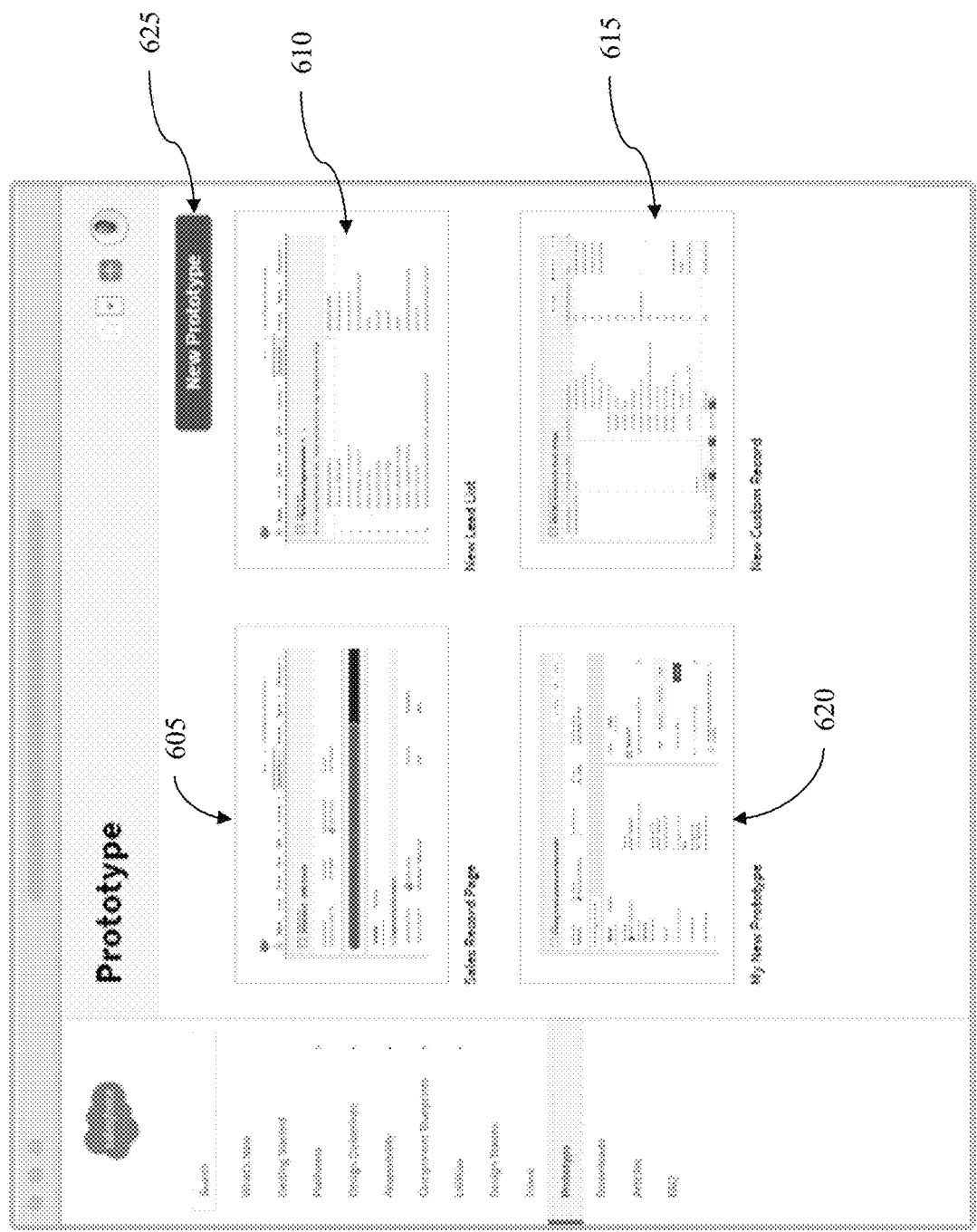
FIG. 6 illustrates an example screen shot of the design environment displaying a plurality of collections, according to some example embodiments.

In some embodiments, the user may use one of the collections to create a prototype, e.g., a UI or application that may be implemented in a live implementation, or create a new prototype from scratch. For example, FIG. 6 illustrates an example screen shot of the design environment 140 displaying a plurality of collections. As illustrated in FIG. 6, the user may use one of a sales record page collection 605, a new lead list collection 610, a new custom record collection 615, or a custom named prototype (i.e., "my new prototype") collection 620 to create a corresponding prototype. Alternatively, the user may create a new prototype using a "New Prototype" button 625.

Figure 7:
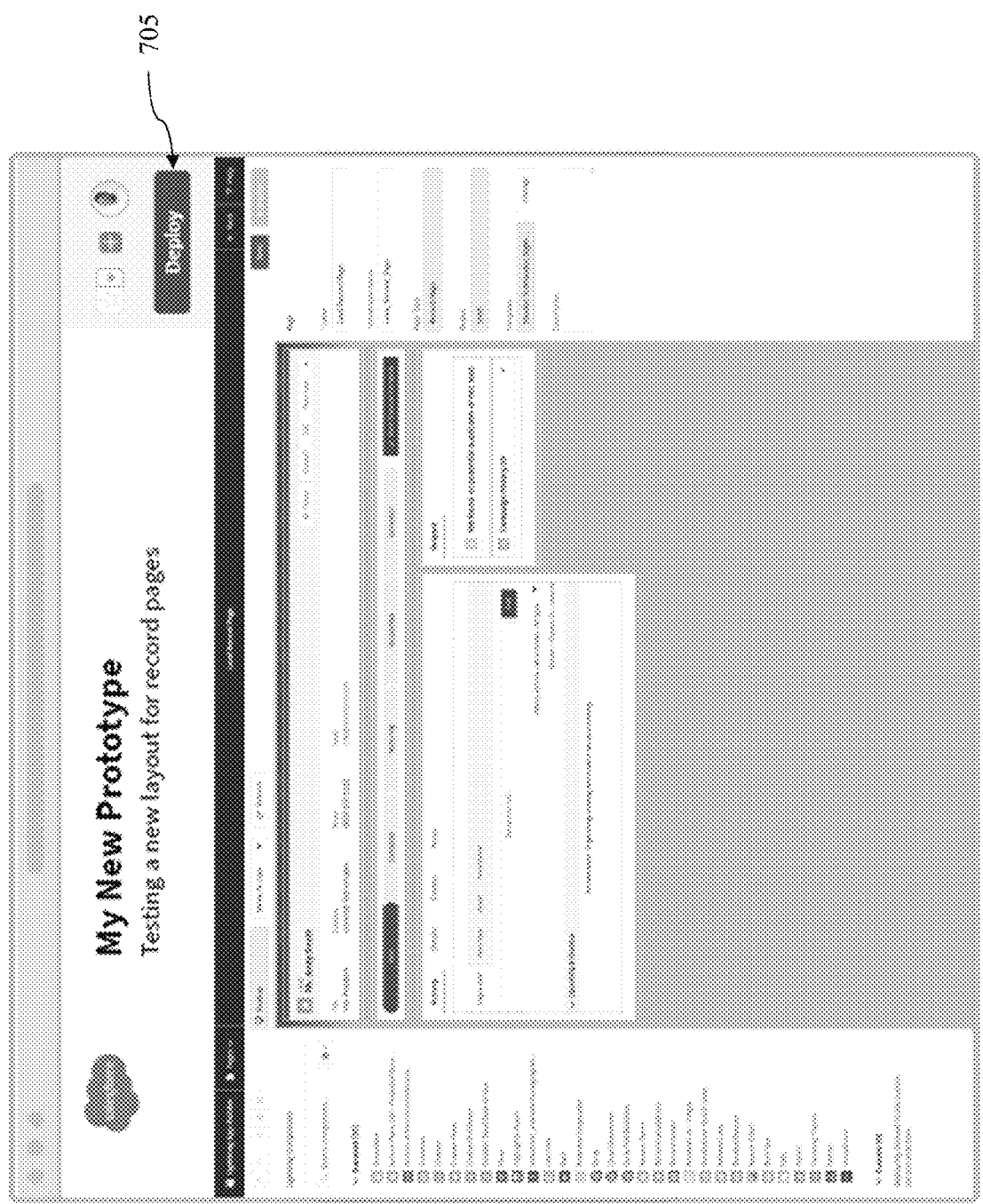
FIG. 7 illustrates an example screen shot of an environment for designing a prototype, according to some example embodiments.

In some embodiments, the user may declaratively build the prototype, as should be understood by those of ordinary skill in the art. For example, FIG. 7 illustrates an example screen shot of an environment for designing a prototype. As shown in FIG. 7, the user may drag and drop a plurality of UI features onto a layout of the prototype, such that the prototype may be created without writing the underlying code. Once the user has designed the prototype, the user may request to deploy the prototype to an instance from among a plurality of instances. For example, the user may select to deploy the prototype using a "Deploy" button 705. In some embodiments, the plurality of instances may be associated with a different stage in a development process for designing the UI. For example, the plurality of instances may include, but are not limited to, a testing environment, a prototyping environment, or a live implementation. In some embodiments, deploying the prototype may include transitioning the prototype from a first stage to a second stage of the development process, e.g., from the design stage of the prototype to the testing environment.

Figure 8:
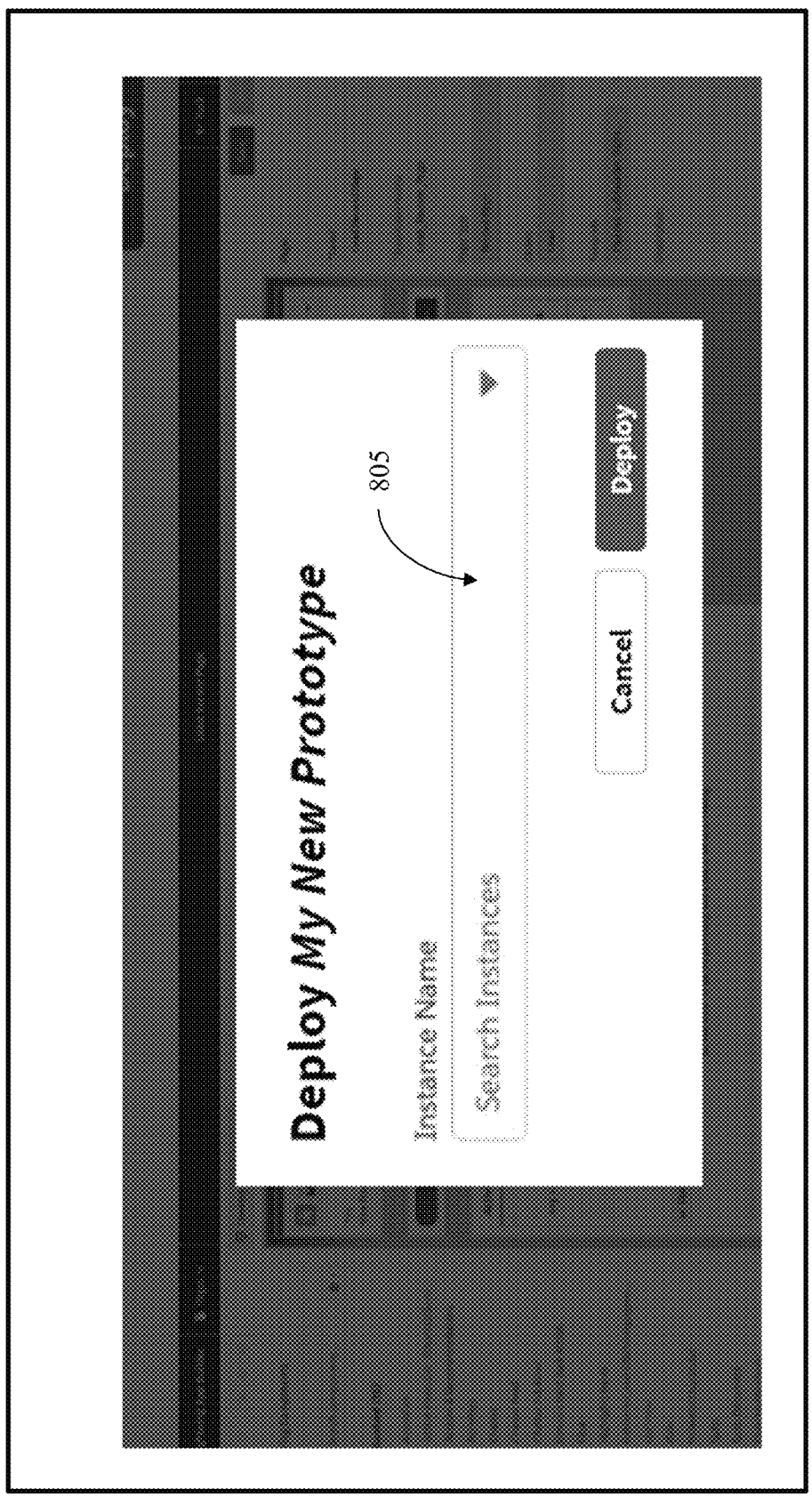
FIG. 8 illustrates an example screen shot of an environment for deploying the prototype, according to some example embodiments

In some embodiments, the user may select which instance of the plurality of instances for deploying the prototype. FIG. 8 illustrates an example screen shot of an environment for designing the prototype. As shown in FIG. 8, in response to receiving, the user may be presented with a drop-down menu 805 for selecting which instance of the plurality of instances for deploying the prototype.

In some embodiments, the user may select to deploy the prototype using a one-click option, e.g., using the "Deploy" button 705. For example, deploying the prototype using the one-click option may deploy the prototype to a next stage in the design process, e.g., from a design stage to the testing environment or from the testing environment to a live implementation. In some embodiments, the prototype may be deployed directly to the live implementation via the one-click option.

Figure 9:
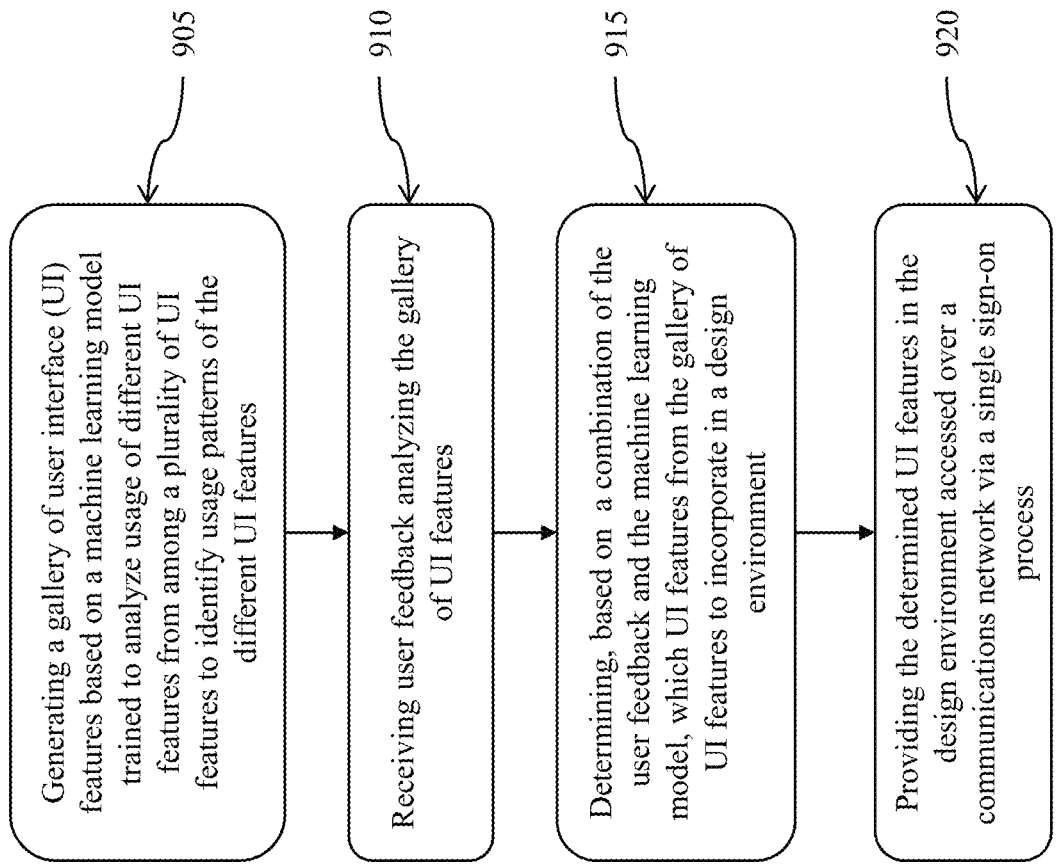
FIG. 9 is a flowchart illustrating a process for determining which UI features from the gallery of UI features to incorporate in a design environment, according to some example embodiments.

FIG. 9 illustrates an example method 900 for determining which UI features from the gallery of UI features to incorporate in a design environment. At 905, the method 900 may include generating a gallery of user interface (UI) features based on a machine learning model trained to analyze usage of different UI features from among a plurality of UI features to identify usage patterns of the different UI features. At 910, the method 900 may include receiving user feedback analyzing the gallery of UI features. At 915, the method 900 may include determining, based on a combination of the user feedback and the machine learning model, which UI features from the gallery of UI features to incorporate in a design environment. At 920, the method 900 may include providing the determined UI features in the design environment accessed over a communications network via a single sign-on process.

Figure 10:
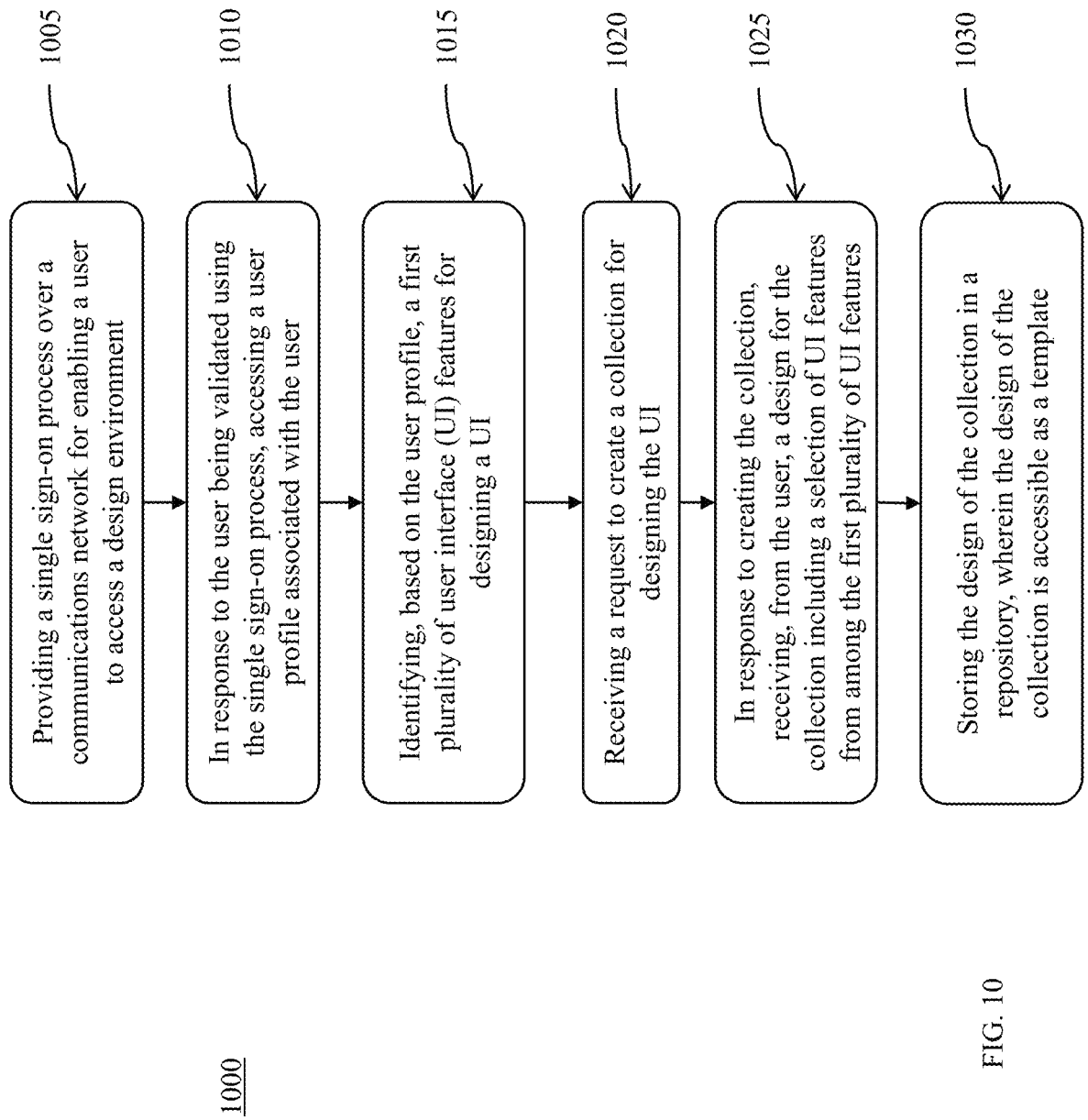
FIG. 10 is a flowchart illustrating a process for creating a collection, according to some example embodiments.

FIG. 10 illustrates an example process 1000 for creating a collection. At 1005, the method 1000 may include providing a single sign-on process over a communications network for enabling a user to access a design environment. At 1010, the method 1000 may also include, in response to the user being validated using the single sign-on process, accessing a user profile associated with the user. At 1015, the method 1000 may also include identifying, based on the user profile, a first plurality of user interface (UI) features for designing a UI. The first plurality of UI features may be selected from among a second plurality of UI features that may be based on usage patterns of a third plurality of UI features. At 1020, the method 1000 may also include receiving a request to create a collection for designing the UI. At 1025, the method may also include, in response to creating the collection, receiving, from the user, a design for the collection including a selection of UI features from among the first plurality of UI features. At 1030, the method may also include storing the design of the collection in a repository, wherein the design of the collection is accessible as a template.

Figure 11:
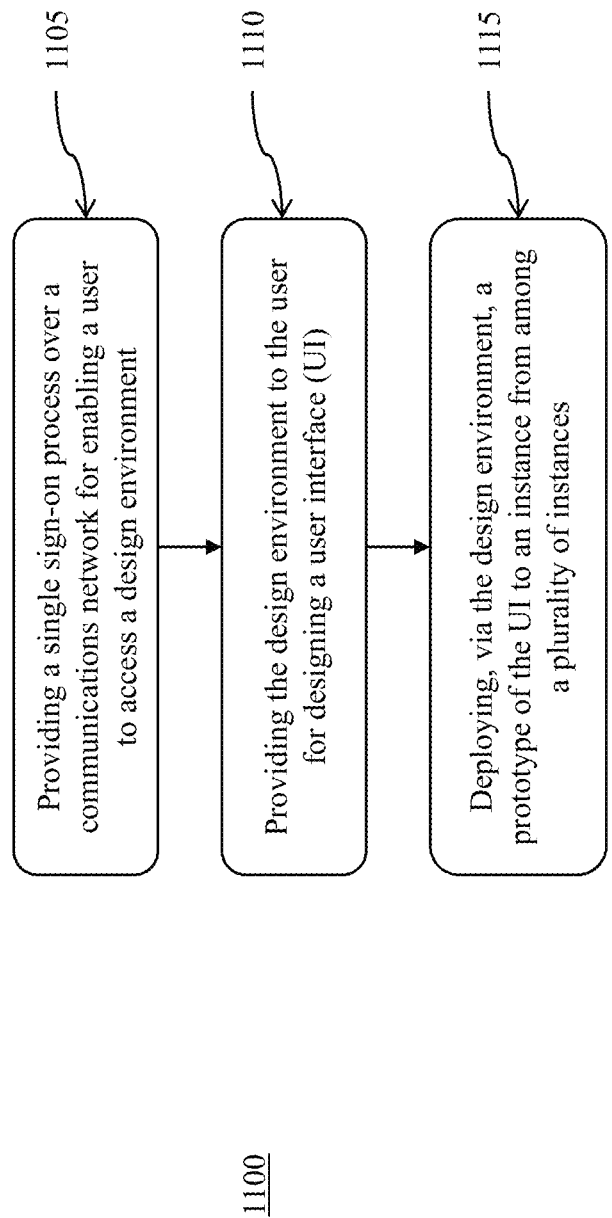
FIG. 11 is a flowchart illustrating a process for deploying a prototype of a UI, according to some example embodiments.

FIG. 11 illustrates an example process 1100 for deploying a prototype of a UI. At 1105, the method 1100 may include providing a single sign-on process over a communications network for enabling a user to access a design environment. At 1110, the method 1100 may include providing the design environment to the user for designing a user interface (UI). At 1115, the method 1100 may include deploying, via the design environment, a prototype of the UI to an instance from among a plurality of instances, wherein each of the plurality of instances is associated with a different stage in a development process for designing the UI, and wherein deploying the prototype of the UI comprises transitioning the prototype of the UI from a first stage to a second stage of the development process.

Figure 12:
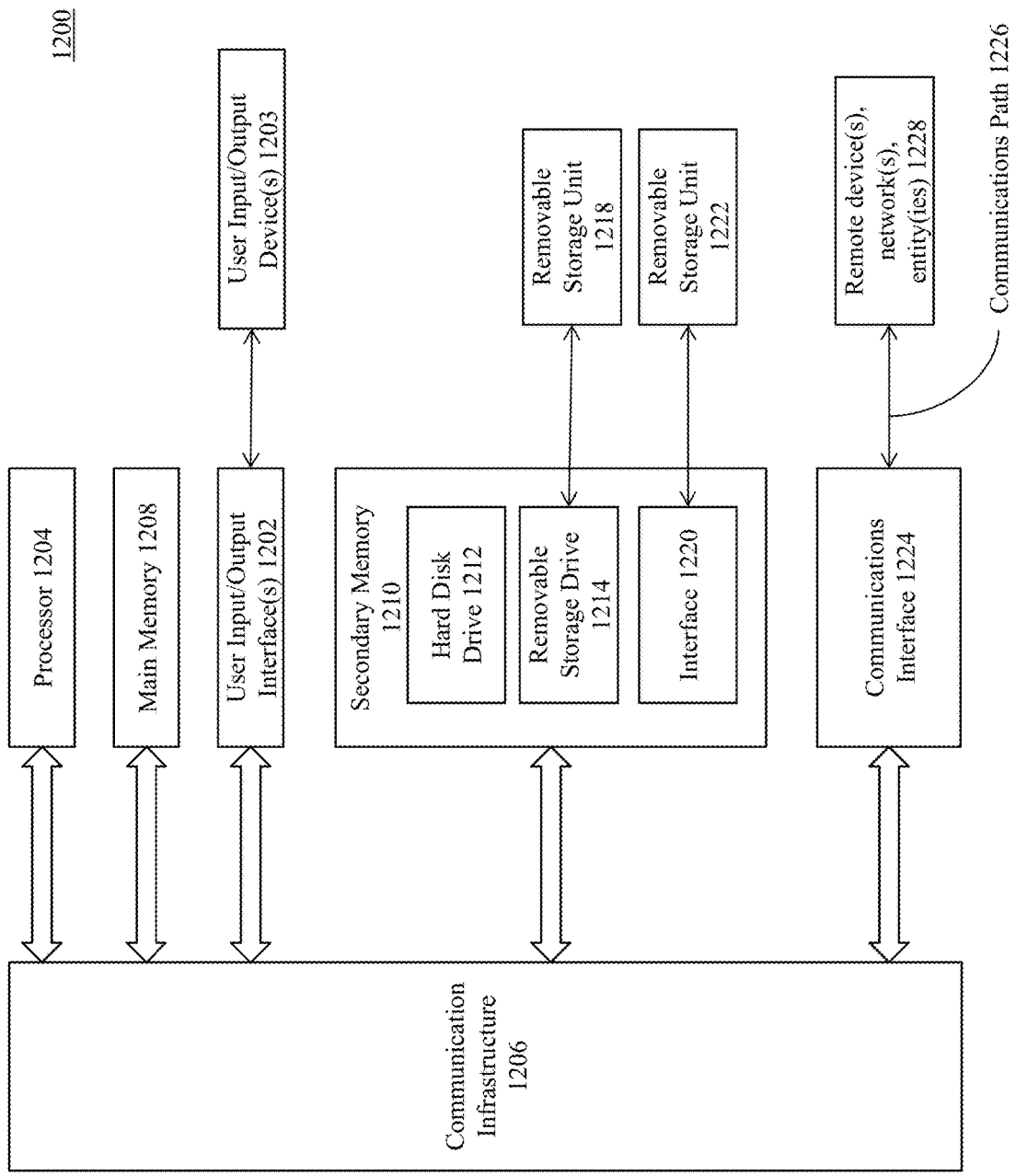
FIG. 12 is an example computer system useful for implementing various embodiments.

Various embodiments may be implemented, for example, using one or more well-known computer systems, such as computer system 1200 shown in FIG. 12. One or more computer systems 1200 may be used, for example, to implement any of the embodiments discussed herein, as well as combinations and sub-combinations thereof.

Computer system 1200 may include one or more processors (also called central processing units, or CPUs), such as a processor 1204. Processor 1204 may be connected to a communication infrastructure or bus 1206.

Computer system 1200 may also include user input/output device(s) 1203, such as monitors, keyboards, pointing devices, etc., which may communicate with communication infrastructure 1206 through user input/output interface(s) 1202.

One or more of processors 1204 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1200 may also include a main or primary memory 1208, such as random access memory (RAM). Main memory 1208 may include one or more levels of cache. Main memory 1208 may have stored therein control logic (i.e., computer software) and/or data.

Computer system 1200 may also include one or more secondary storage devices or memory 1210. Secondary memory 1210 may include, for example, a hard disk drive 1212 and/or a removable storage device or drive 1214. Removable storage drive 1214 may be a floppy disk drive, a magnetic tape drive, a compact disk drive, an optical storage device, tape backup device, and/or any other storage device/drive.

Removable storage drive 1214 may interact with a removable storage unit 1218. Removable storage unit 1218 may include a computer usable or readable storage device having stored thereon computer software (control logic) and/or data. Removable storage unit 1218 may be a floppy disk, magnetic tape, compact disk, DVD, optical storage disk, and/any other computer data storage device. Removable storage drive 1214 may read from and/or write to removable storage unit 1218.

Secondary memory 1210 may include other means, devices, components, instrumentalities or other approaches for allowing computer programs and/or other instructions and/or data to be accessed by computer system 1200. Such means, devices, components, instrumentalities or other approaches may include, for example, a removable storage unit 1222 and an interface 1220. Examples of the removable storage unit 1222 and the interface 1220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 may further include a communication or network interface 1224. Communication interface 1224 may enable computer system 1200 to communicate and interact with any combination of external devices, external networks, external entities, etc. (individually and collectively referenced by reference number 1228). For example, communication interface 1224 may allow computer system 1200 to communicate with external or remote devices 1228 over communications path 1226, which may be wired and/or wireless (or a combination thereof), and which may include any combination of LANs, WANs, the Internet, etc. Control logic and/or data may be transmitted to and from computer system 1200 via communication path 1226.

Computer system 1200 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1200 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1200 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1200, main memory 1208, secondary memory 1210, and removable storage units 1218 and 1222, as well as tangible articles of manufacture embodying any combination of the foregoing. Such control logic, when executed by one or more data processing devices (such as computer system 1200), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 12. In particular, embodiments can operate with software, hardware, and/or operating system embodiments other than those described herein.

While this disclosure describes example embodiments for example fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

The foregoing description of the example embodiments will so fully reveal the general nature of the invention that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described example embodiments, but should be defined only in accordance with the following claims and their equivalents.

What is claimed is:

1. A computer-implemented method, comprising:
providing a single sign-on process over a communications network for enabling a user to access a design environment of a plurality of environments;
providing the design environment to the user for designing a user interface (UI), wherein the design environment presents the user with a gallery of UI features configured to be placed by the user within a prototype of the UI, wherein a machine learning (ML) model trained to identify usage patterns of a plurality of UI features over a plurality of implementations of the plurality of UI features ranks, for an implementation of the plurality of implementations corresponding to the UI, the plurality of UI features to select the gallery of UI features; and
deploying, via the design environment, the prototype of the UI to an instance from among a plurality of instances, wherein each of the plurality of instances is associated with a different stage in a development process for designing the UI, and wherein deploying the prototype of the UI comprises transitioning the prototype of the UI from a first stage of the development process corresponding to the design environment to a prototype of the UI in a second stage of the development process corresponding to the plurality of environments subsequent to the design environment.

2. The method of claim 1, wherein the plurality of instances comprises one or more of a testing environment, a prototyping environment, or a live implementation.

3. The method of claim 1, further comprising receiving a selection of one of the plurality of instances for deploying the prototype.

4. The method of claim 1, further comprising providing a one-click option for deploying the prototype, and wherein deploying the prototype comprises deploying the prototype via the one-click option.

5. The method of claim 4, wherein deploying the prototype of the UI comprises deploying the prototype of the UI directly to a live implementation of the UI via the one-click option.

6. The method of claim 1, wherein, in response to the user being validated using the single sign-on process, the method further comprises accessing a user profile associated with the user.

7. The method of claim 6, wherein a list of available features for designing the UI is based on the user profile associated with the user.

8. A non-transitory computer-readable device having instructions stored thereon that, when executed by at least one computing device, cause the at least one computing device to perform operations comprising:
providing a single sign-on process over a communications network for enabling a user to access a design environment of a plurality of environments;
providing the design environment to the user for designing a user interface (UI), wherein the design environment presents the user with a gallery of UI features configured to be placed by the user within a prototype of the UI, wherein a machine learning (ML) model trained to identify usage patterns of a plurality of UI features over a plurality of implementations of the plurality of UI features ranks, for an implementation of the plurality of implementations corresponding to the UI, the plurality of UI features to select the gallery of UI features; and
deploying, via the design environment, the prototype of the UI to an instance from among a plurality of instances, wherein each of the plurality of instances is associated with a different stage in a development process for designing the UI, and wherein deploying the prototype of the UI comprises transitioning the prototype of the UI from a first stage of the development process corresponding to the design environment to a prototype of the UI in a second stage of the development process corresponding to the plurality of environments subsequent to the design environment.

9. The non-transitory computer-readable device of claim 8, wherein the plurality of instances comprises one or more of a testing environment, a prototyping environment, or a live implementation.

10. The non-transitory computer-readable device of claim 8, the operations further comprising receiving a selection of one of the plurality of instances for deploying the prototype.

11. The non-transitory computer-readable device of claim 8, the operations further comprising providing a one-click option for deploying the prototype, and wherein deploying the prototype comprises deploying the prototype via the one-click option.

12. The non-transitory computer-readable device of claim 11, wherein deploying the prototype of the UI comprises deploying the prototype of the UI directly to a live implementation of the UI via the one-click option.

13. The non-transitory computer-readable device of claim 8, wherein, in response to the user being validated using the single sign-on process, the operations further comprise accessing a user profile associated with the user.

14. The non-transitory computer-readable device of claim 13, wherein a list of available features for designing the UI is based on the user profile associated with the user.

15. A system comprising:
a memory; and
a processor coupled to the memory and configured to:
provide a single sign-on process over a communications network for enabling a user to access a design environment of a plurality of environments;
provide the design environment to the user for designing a user interface (UI), wherein the design environment presents the user with a gallery of UI features configured to be placed by the user within a prototype of the UI, wherein a machine learning (ML) model trained to identify usage patterns of a plurality of UI features over a plurality of implementations of the plurality of UI features ranks, for an implementation of the plurality of implementations corresponding to the UI, the plurality of UI features to select the gallery of UI features; and
deploy, via the design environment, the prototype of the UI to an instance from among a plurality of instances, wherein each of the plurality of instances is associated with a different stage in a development process for designing the UI, and wherein deploying the prototype of the UI comprises transitioning the prototype of the UI from a first stage of the development process corresponding to the design environment to a prototype of the UI in a second stage of the development process corresponding to the plurality of environments subsequent to the design environment.

16. The system of claim 15, wherein the plurality of instances comprises one or more of a testing environment, a prototyping environment, or a live implementation.

17. The system of claim 15, wherein the processor is further configured to receive a selection of one of the plurality of instances for deploying the prototype.

18. The system of claim 15, wherein the processor is further configured to provide a one-click option for deploying the prototype, and wherein deploying the prototype comprises deploying the prototype via the one-click option.

19. The system of claim 18, wherein deploying the prototype of the UI comprises deploying the prototype of the UI directly to a live implementation of the UI via the one-click option.

20. The system of claim 15, wherein, in response to the user being validated using the single sign-on process, the processor is further configured to access a user profile associated with the user, and wherein a list of available features for designing the UI is based on the user profile associated with the user.

* * * * *